US012791800B2

(12) United States Patent
Narayanan et al.

(10) Patent No.: US 12,791,800 B2
(45) Date of Patent: Nov. 10, 2026

(54) NETWORK CABLE AND CONNECTOR FOR CABLE IDENTIFICATION

(71) Applicant: Lenovo Enterprise Solutions (Singapore) Pte. Ltd., New Tech Park (SG)

(72) Inventors: Ananthakrishnan Narayanan, Durham, NC (US); Robert R. Wolford, Strongsville, OH (US); Fernando Santiago, Apex, NC (US); Jerry D. Ackaret, Beaverton, OR (US); Brian C. Totten, Durham, NC (US); James C. Loebach, Raleigh, NC (US); Paul Klustaitis, Cary, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 298 days.

(21) Appl. No.: 18/414,723

(22) Filed: Jan. 17, 2024

(65) Prior Publication Data

US 2025/0231355 A1 Jul. 17, 2025

(51) Int. Cl.
*G02B 6/38* (2006.01)
*G02B 6/44* (2006.01)
*H01B 11/22* (2006.01)

(52) U.S. Cl.
CPC ......... *G02B 6/3893* (2013.01); *G02B 6/4431* (2023.05); *H01B 11/22* (2013.01)

(58) Field of Classification Search
CPC ... G02B 6/3893; G02B 6/3817; G02B 6/4293
See application file for complete search history.

(56) References Cited

U.S. PATENT DOCUMENTS 6,577,243 B1 * 6/2003 Dannenmann ..... H01R 13/6641 340/815.45
2009/0060418 A1 * 3/2009 Munn .................... G02B 6/381 385/53
2012/0196488 A1 * 8/2012 Su ........................ G02B 6/3817 439/676
2015/0003793 A1 * 1/2015 Lee ...................... G02B 6/4285 385/92

OTHER PUBLICATIONS

Mertek, “EVO6™ Category 6 Self-Tracing LED Patch Cords”, CableOrganizer, date known about and downloaded on Oct. 17, 2023, pp. 1-3.

* cited by examiner

*Primary Examiner* — Lisa M Caputo
(74) *Attorney, Agent, or Firm* — Kunzler Needham & Hilton; Bruce R. Needham

(57) ABSTRACT

A network cable is disclosed. The network cable includes a plurality of network cable conductors. The plurality of network cable conductors include a first end and a second end. The network cable includes a connector coupled to the first end of the network cable conductors. The connector is configured to engage with a jack. The network cable includes a fiber-optic cable attached to the plurality of network cable conductors along a length of the plurality of network cable conductors. The fiber-optic cable includes a first end positioned on the connector to align with a light source adjacent to the jack. Light from the light source is transmitted within the fiber-optic cable to a second end of the fiber-optic cable opposite to the first end.

20 Claims, 9 Drawing Sheets

NETWORK CABLE AND CONNECTOR FOR CABLE IDENTIFICATION

FIELD

The subject matter disclosed herein relates to network cables and more particularly relates to network cables and connectors for cable identification.

BACKGROUND

Network cables, such as Ethernet cables or local area network ("LAN") cables, facilitate the flow of information and/or data between devices. Network cables include connectors for engaging with a jack, such as a Registered Jack-45 ("RJ45") connector for engaging an Ethernet cable with a jack.

BRIEF SUMMARY

A network cable is disclosed. The network cable includes a plurality of network cable conductors. The plurality of network cable conductors include a first end and a second end. The network cable includes a connector coupled to the first end of the network cable conductors. The connector is configured to engage with a jack. The network cable includes a fiber-optic cable attached to the plurality of network cable conductors along a length of the plurality of network cable conductors. The fiber-optic cable includes a first end positioned on the connector to align with a light source adjacent to the jack. Light from the light source is transmitted within the fiber-optic cable to a second end of the fiber-optic cable opposite to the first end.

A system is disclosed. The system includes a cable testing apparatus and a network cable. The cable testing apparatus includes a jack and a light source adjacent to the jack. The network cable includes a plurality of network cable conductors. The plurality of network cable conductors include a first end and a second end. The network cable includes a connector coupled to the first end of the network cable conductors. The connector is configured to engage with the jack. The network cable includes a fiber-optic cable attached to the plurality of network cable conductors along a length of the plurality of network cable conductors. The fiber-optic cable includes a first end positioned on the connector to align with the light source. Light from the light source is transmitted within the fiber-optic cable to a second end of the fiber-optic cable opposite to the first end.

A network cable includes a plurality of network cable conductors including a first end and a second end. The network cable includes a first connector coupled to the first end of the network cable conductors. The first connector is configured to engage with a jack. The network cable includes a first fiber-optic cable attached to the plurality of network cable conductors along a length of the plurality of network cable conductors. The first fiber-optic cable includes a first end positioned on the first connector to align with a first light source adjacent to the jack with a first raised section of the first connector. Light from the first light source is transmitted within the first fiber-optic cable to a second end of the first fiber-optic cable opposite to the first end. The network cable includes a second fiber-optic cable attached to the plurality of network cable conductors. The second fiber-optic cable includes a first end positioned on the first connector to align with a second light source adjacent to the jack with a second raised section of the first connector. Light from the light source is transmitted within the second fiber-optic cable to a second end of the second fiber-optic cable opposite to the first end. The network cable includes a second connector at the second end of the plurality of network cable conductors. When the second connector is plugged into the jack, the second end of the second fiber-optic cable is positioned to align with the first light source with a first raised section of the second connector and the second end of the first fiber-optic cable is positioned to align with the second light source with a second raised section of the second connector.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
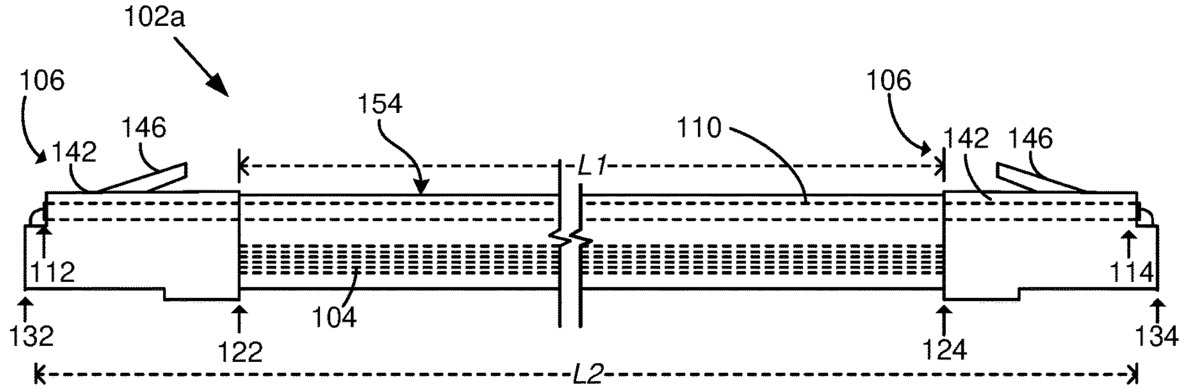
FIG. 1A is a side view of a network cable, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, Hypertext Processor ("PHP"), or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A network cable is disclosed. The network cable includes a plurality of network cable conductors. The plurality of network cable conductors include a first end and a second end. The network cable includes a connector coupled to the first end of the network cable conductors. The connector is configured to engage with a jack. The network cable includes a fiber-optic cable attached to the plurality of network cable conductors along a length of the plurality of network cable conductors. The fiber-optic cable includes a first end positioned on the connector to align with a light source adjacent to the jack. Light from the light source is transmitted within the fiber-optic cable to a second end of the fiber-optic cable opposite to the first end.

In some examples, the fiber-optic cable is a first fiber-optic cable. The light source is a first light source. The apparatus further includes a second fiber-optic cable attached to the plurality of network cable conductors. The second fiber-optic cable includes a first end positioned on the connector to align with a second light source adjacent to the jack. Light from the light source is transmitted within the second fiber-optic cable to a second end of the second fiber-optic cable opposite to the first end.

In some examples, the first end of the first fiber-optic cable is positioned to align with the first light source with a first raised section of the connector. The first end of the second fiber-optic cable is positioned to align with the second light source with a second raised section of the connector. The connector further includes a tab configured to release the connector from the jack and positioned between the first and second raised sections. The tab extends beyond the first and second raised sections. In some examples, the jack is a first jack, and the connector is a first connector. In some examples, the network cable further includes a second connector at the second end of the plurality of network cable conductors. In some examples, the second connector is plugged into a second jack. In some examples, the second end of the second fiber-optic cable is positioned to align with the first light source with a first raised section of the second connector, and the second end of the first fiber-optic cable is positioned to align with the second light source with a second raised section of the second connector.

In some examples, transmitting the light within the fiber-optic cable to the second end of the fiber-optic cable illuminates the second end of the fiber-optic cable and the second end of the fiber-optic cable is exposed to allow viewing of the light. In some examples, the connector is a first connector. In some examples, the network cable includes a second connector coupled to the second end of the network cable conductors. In some examples, the second end of the fiber-optic cable is positioned to illuminate the second connector.

In some examples, a length of the fiber-optic cable between the first end and the second end is positioned to be visible to a user. Light from the light source is visible along the length of the fiber-optic cable. In some examples, the length of the fiber-optic cable is visible through a jacket surrounding the plurality of network cables and fiber-optic cable and/or is exposed through a gap in a jacket surrounding the plurality of network cables and fiber-optic cable.

In some examples, the network cable includes a cable testing device. In some examples, the cable testing device includes a jack and a test light source positioned adjacent to the jack. In some examples, the light source is positioned to align with the first end of the fiber-optic cable. In some examples, light from the test light source illuminates the first end of the fiber-optic cable and transmits light to the second end of the fiber-optic cable.

In some examples, the light source is offset from the jack. The connector includes a raised section configured to maintain the first end of the fiber-optic cable aligned with the light source.

A system is disclosed. The system includes a cable testing apparatus and a network cable. The cable testing apparatus includes a jack and a light source adjacent to the jack. The network cable includes a plurality of network cable conductors. The plurality of network cable conductors include a first end and a second end. The network cable includes a connector coupled to the first end of the network cable conductors. The connector is configured to engage with the jack. The network cable includes a fiber-optic cable attached to the plurality of network cable conductors along a length of the plurality of network cable conductors. The fiber-optic cable includes a first end positioned on the connector to align with the light source. Light from the light source is transmitted within the fiber-optic cable to a second end of the fiber-optic cable opposite to the first end.

In some examples, the cable testing apparatus is portable, and the jack is configured to receive the connector without forming an electrical connection between the network cable and the cable testing apparatus. In some examples, the cable testing apparatus is part of a computing device. In some examples, the computing device utilizes the network cable for network communications. In some examples, the system includes a controller configured to activate and/or deactivate the light source. In some examples, the system includes an application providing a graphical user interface ("GUI"). In some examples, the GUI is configured to receive user input to activate and/or deactivate the light source via the controller.

In some examples, the fiber-optic cable is a first fiber-optic cable. The light source is a first light source. The cable testing apparatus further includes a second fiber-optic cable attached to the plurality of network cable conductors. The second fiber-optic cable includes a first end positioned on the connector to align with a second light source adjacent to the jack. Light from the light source is transmitted within the second fiber-optic cable to a second end of the second fiber-optic cable opposite to the first end.

In some examples, the first end of the first fiber-optic cable is positioned to align with the first light source with a first raised section of the connector. The first end of the second fiber-optic cable is positioned to align with the second light source with a second raised section of the connector. The connector further includes a tab configured to release the connector from the jack and positioned between the first and second raised sections. The tab extends beyond the first and second raised sections. In some examples, the jack is a first jack, and the connector is a first connector. In some examples, the network cable further includes a second connector at the second end of the plurality of network cable conductors. In some examples, the second connector is plugged into a second jack. In some examples, the second end of the second fiber-optic cable is positioned to align with the first light source with a first raised section of the second connector, and the second end of the first fiber-optic cable is positioned to align with the second light source with a second raised section of the second connector. In some examples, transmitting the light within the fiber-optic cable to the second end of the fiber-optic cable illuminates the second end of the fiber-optic cable. In some examples, the second end of the fiber-optic cable is exposed to allow viewing of the light.

A network cable includes a plurality of network cable conductors including a first end and a second end. The network cable includes a first connector coupled to the first end of the network cable conductors. The first connector is configured to engage with a jack. The network cable includes a first fiber-optic cable attached to the plurality of network cable conductors along a length of the plurality of network cable conductors. The first fiber-optic cable includes a first end positioned on the first connector to align with a first light source adjacent to the jack with a first raised section of the first connector. Light from the first light source is transmitted within the first fiber-optic cable to a second end of the first fiber-optic cable opposite to the first end. The network cable includes a second fiber-optic cable attached to the plurality of network cable conductors. The second fiber-optic cable includes a first end positioned on the first connector to align with a second light source adjacent to the jack with a second raised section of the first connector. Light from the light source is transmitted within the second fiber-optic cable to a second end of the second fiber-optic cable opposite to the first end. The network cable includes a second connector at the second end of the plurality of network cable conductors. When the second connector is plugged into the jack, the second end of the second fiber-optic cable is positioned to align with the first light source with a first raised section of the second connector and the second end of the first fiber-optic cable is positioned to align with the second light source with a second raised section of the second connector.

Certain environments, such as data centers and network closets, can include multiple network cables and ports in an area where tracing a single cable may be difficult. Embodiments of the present disclosure include network cables and systems that help to facilitate identification of a network cable corresponding to a particular jack by integrating fiber optic cables and shaping network cable connectors to use the fiber optic cables in connection with already-present light sources near each jack or a special use light source at the end of a cable.

FIG. 1A is a side view of a network cable 102*a*, according to various embodiments. In some examples, the network cable 102*a* is configured to communicably connect devices. In some examples, the network cable 102*a* is configured to connect a computing device (e.g., a computer and/or server) to other devices in a local area network ("LAN"). In some examples, the network cable 102*a* is configured to connect a device to the Internet. In some examples, the network cable 102*a* includes an Ethernet cable, telephone cable, fiber-optic cable, coaxial cable, and/or any combination thereof.

In some examples, the network cable 102*a* includes a plurality of network cable conductors 104. In some examples, each of the network cable conductors 104 is configured to transmit information. In some examples, the network cable 102*a* includes eight network cable conductors 104. In some examples, the eight network cable conductors 104 include four pairs of network cable conductors 104, which may be in twisted, shielded pairs. In some examples, the network cable conductors 104 are insulated wires. In some examples, each of the network cable conductors 104 are surrounded by an individual insulation layer. In some examples, the network cable 102 includes a number of shielding layers, each of which surround a pair of conductors 104.

In some examples, the plurality of network cable conductors 104 include a first end 122 and a second end 124. While the network cable conductors 104 are shown terminating at connectors 106, one of skill in the art will recognize that the network cable conductors 104 terminate within the connectors 106. In some examples, a first network cable conductor 104 of a pair of network cable conductors 104 is configured to transmit information from the first end 122 to the second end 124, and a second network cable conductor 104 of the pair is configured to transmit information from the second end 124 to the first end 122.

Figure 2A:
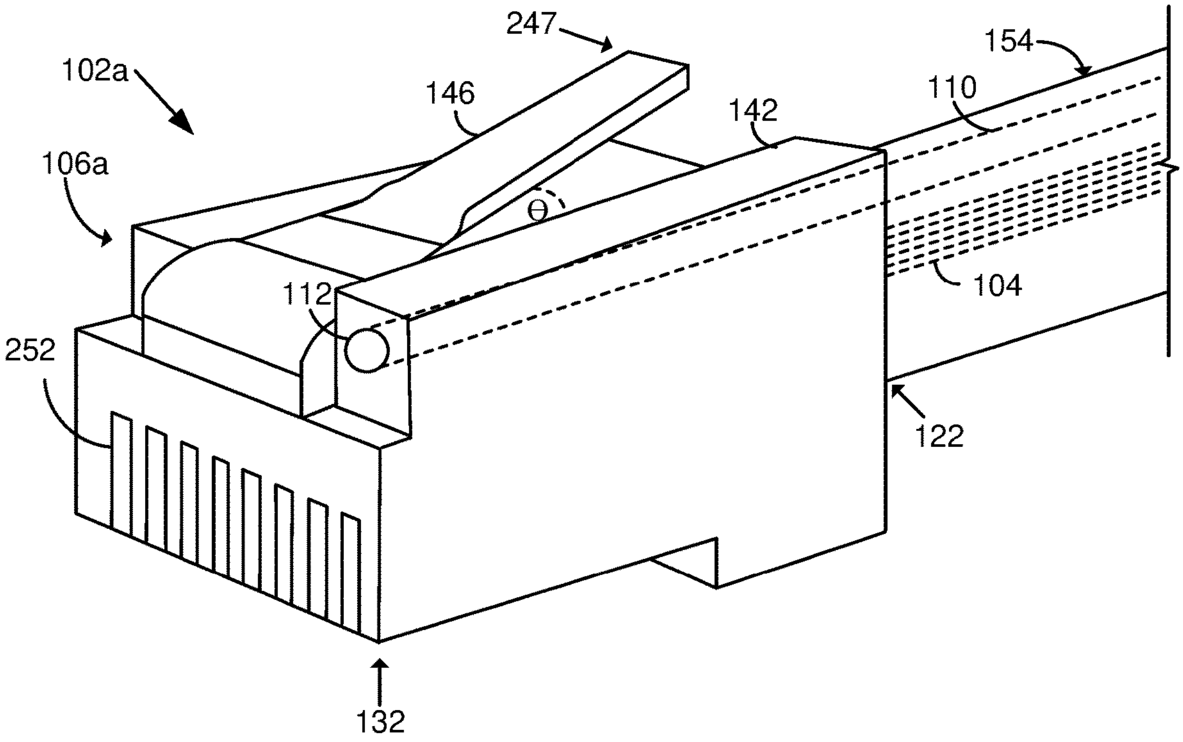
FIG. 2A is a close-up, perspective view of a network cable, according to various embodiments.
Figure 2B:
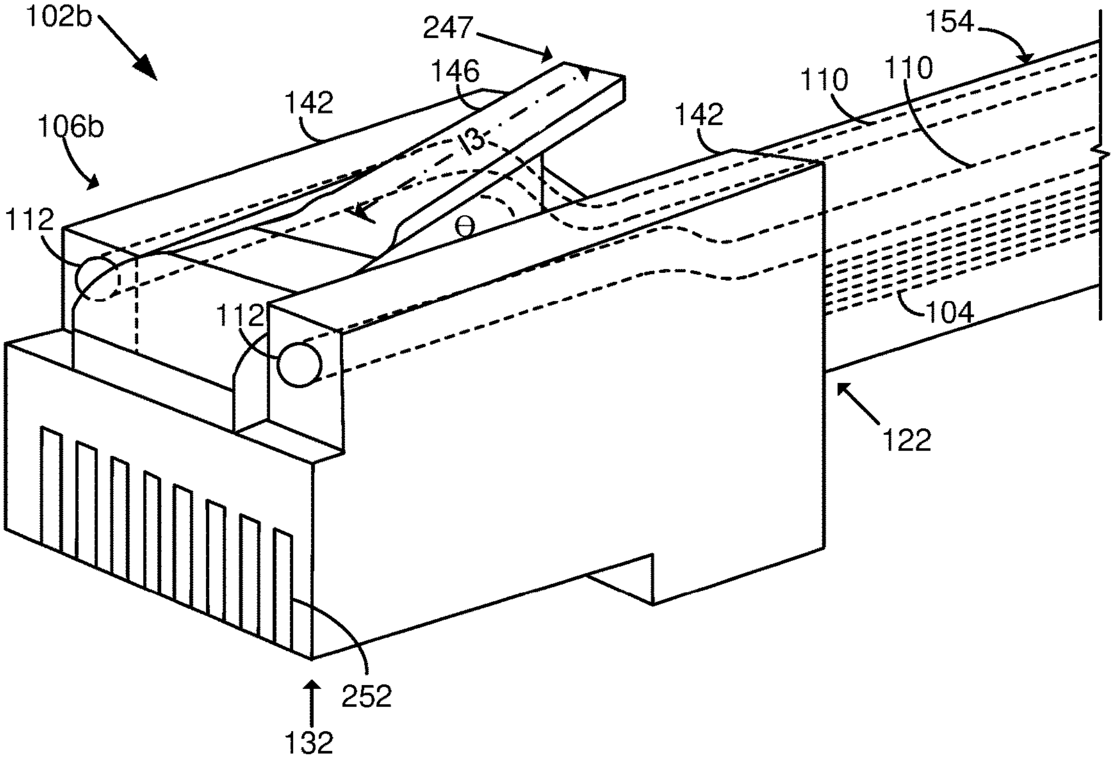
FIG. 2B is a perspective view of a network cable having two fiber optic cables, according to various embodiments.
Figure 3:
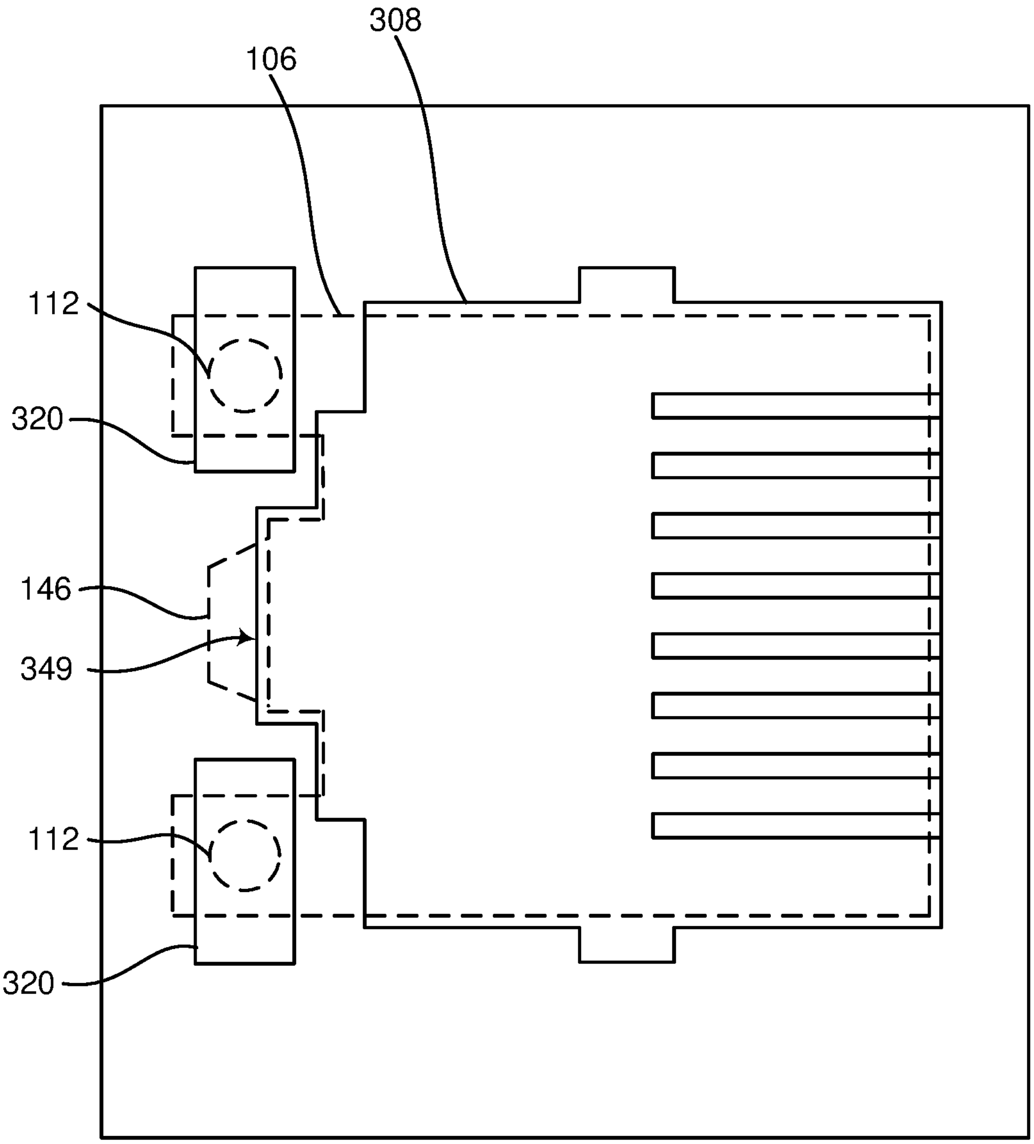
FIG. 3 is a schematic block diagram illustrating an end view of a jack engaged with a connector, according to various embodiments.
Figure 5A:
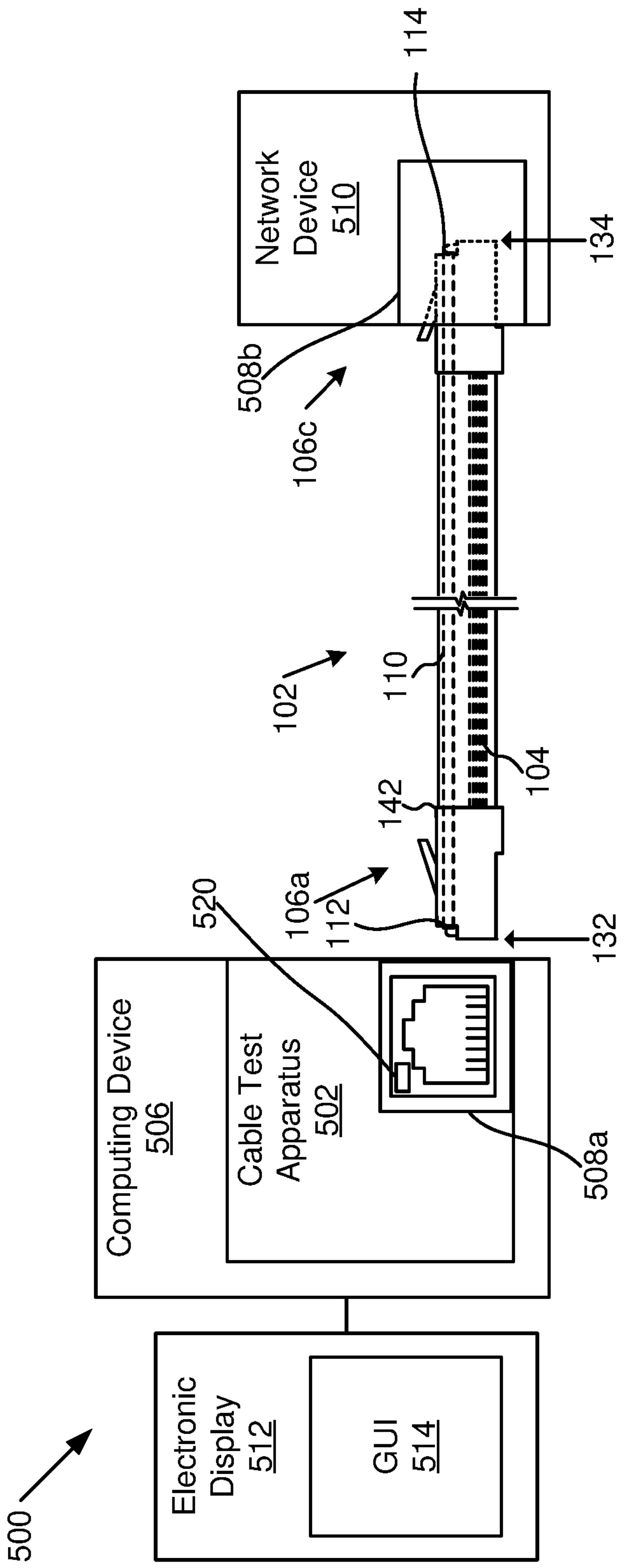
FIG. 5A is a schematic block diagram illustrating a system for cable identification, according to various embodiments.
Figure 5B:
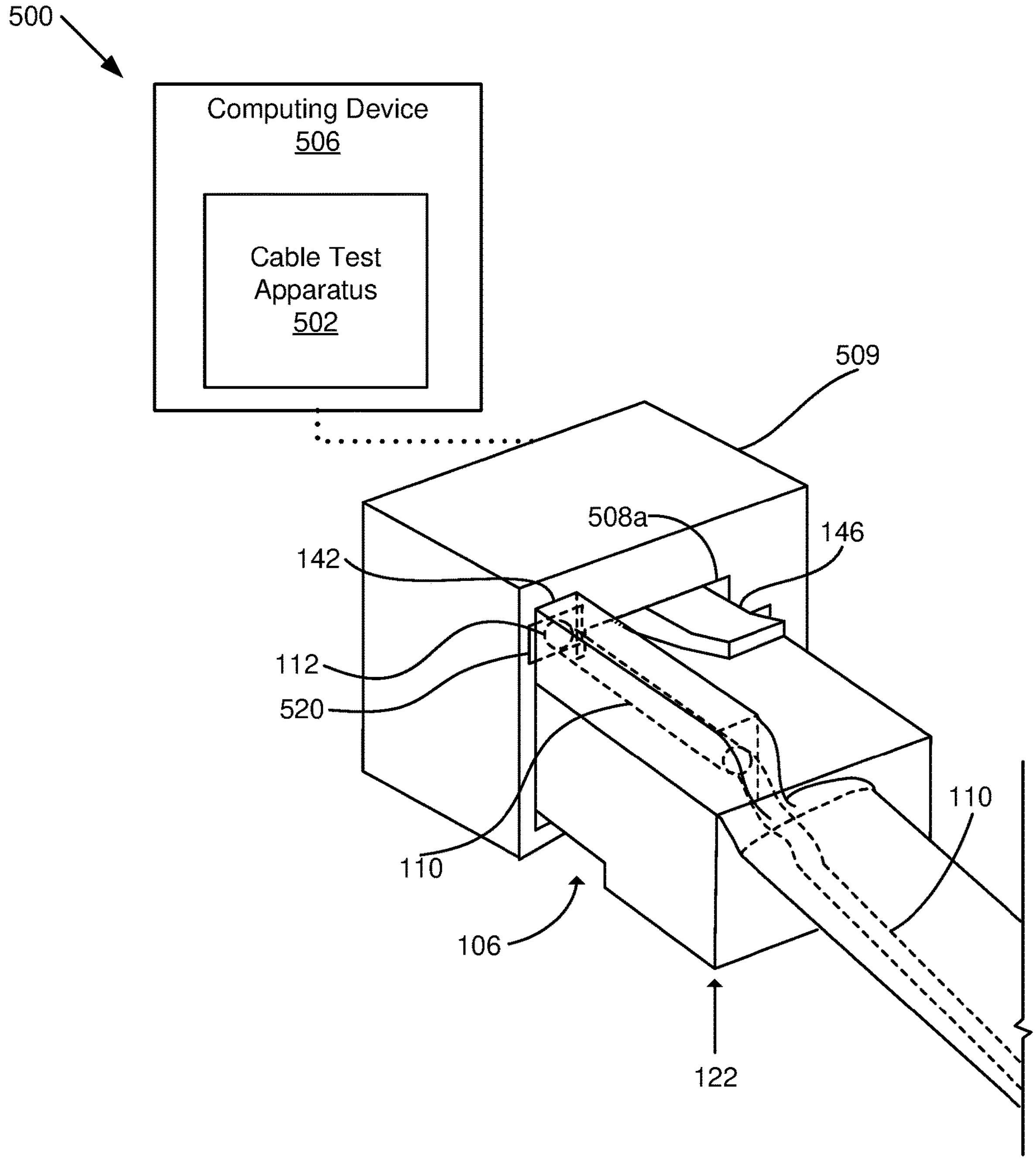
FIG. 5B is a schematic block diagram illustrating a system for cable identification with a network cable plugged into a jack, according to various embodiments.

In some examples, the network cable 102*a* includes a first connector 106 coupled to the first end 122 of the network cable conductors 104. In some examples, the network cable 102*a* includes a second connector 106 coupled to the second end 124 of the network cable conductors 104. In some examples, the connector 106 is configured to engage with a jack, as shown in FIGS. 3 and 5A-B. In some examples, each connector 106 includes a tab 146 configured to release the connector 106 from a jack and/or facilitate insertion of the connector 106 into a jack. In some examples, the connector 106 is an RJ-45 connector. As shown in FIGS. 2A-B, in some examples, the connector 106 includes a number of pins 252. In some examples, the connector 106 includes eight pins 252 arranged in a row.

In some examples, the network cable 102*a* includes a fiber-optic cable 110 attached to the plurality of network cable conductors 104 at least along a length L1 of the plurality of network cable conductors 104. In some examples, the fiber-optic cable 110 is attached to the plurality of network cable conductors 104 via a jacket 154 that encloses both the plurality of network cable conductors 104 and the fiber-optic cable 110. In some examples, the jacket 154 is made of a translucent and/or transparent material. In some examples, the jacket 154 is an outermost layer of the network cable 102. In some examples, the jacket 154 includes a flexible material, such as polyvinyl chloride.

As shown in FIGS. 3 and 5A-B, in some examples, the fiber-optic cable 110 includes a first end 112 positioned on the connector 106 to align with a light source 320 adjacent to a jack 308 with which the connector 106 is engaged such that the light source 320 transmits light into and through the fiber-optic cable. In some examples, the light transmitted by the light source 320 is internally reflected within the fiber-optic cable 110. In some examples, the light source 320 thus illuminates a length L2 of the fiber-optic cable 110 and/or an opposite end 114 of the fiber-optic cable 110. In some examples, the network cable 102*a* does not include any additional light or power sources, and the fiber-optic cable 110 is illuminated solely by light from the light source 320. In some examples, the fiber-optic cable 110 includes multiple fibers. In some examples, the fiber-optic cable 110 has a diameter of not less than 0.1 centimeters ("cm") and not greater than 1 cm.

Figure 1B:
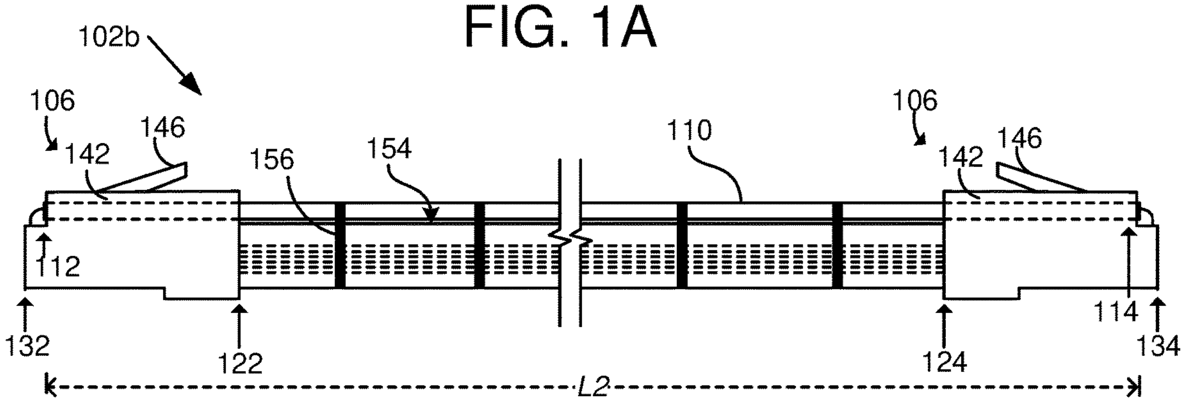
FIG. 1B is a side view of a network cable having a fiber optic cable attached to a plurality of network cable conductors, according to various embodiments.
Figure 1C:
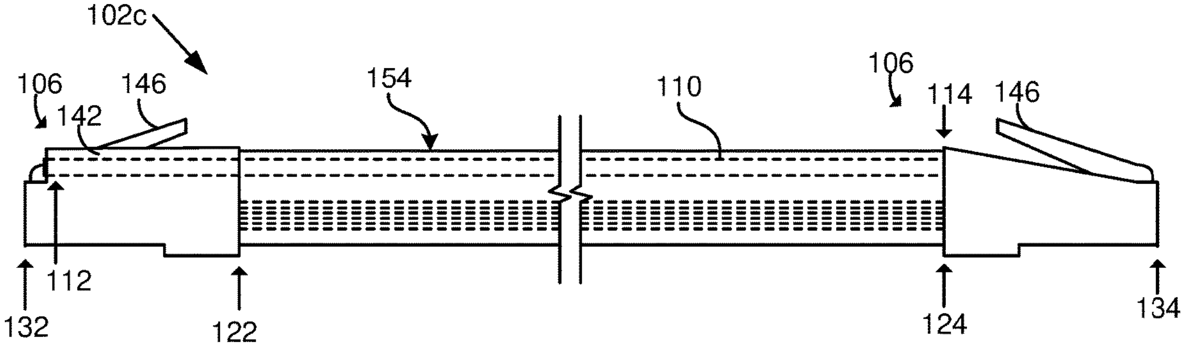
FIG. 1C is a side view of a network cable having two connectors, according to various embodiments.

As shown in FIGS. 1A-C, in some examples, a length L2 of the fiber optic cable 110 between the first end 112 and the second end 114 is positioned to be visible to a user. In some examples, light from a light source 320 adjacent to the jack 308 is visible along the length L2 of fiber-optic cable 110 and/or along the length L1. In some examples, as shown in FIG. 1A, a portion of the fiber-optic cable 110 along a length L1 of the conductors 104 is visible through a jacket 154 surrounding the plurality of network cable conductors 104 and the fiber-optic cable 110. In such examples, the jacket 154 is made of a translucent and/or transparent material, such that light from the light source 320 being transmitted through the fiber-optic cable 110 is visible through the jacket 154.

Although not shown in FIG. 1A, in some examples, the fiber optic cable 110 is exposed through gaps in a jacket 154 surrounding the plurality of network cable conductors 104 and the fiber optic cable 110. In some examples, the gaps are positioned along the length L2 of the conductors 104.

FIG. 1B is a side view of a network cable 102*b* having a fiber optic cable 110 attached to a plurality of network cable conductors 104, according to various embodiments.

In some examples, the fiber-optic cable 110 is coupled to the conductors 104 along a length L2 of the fiber-optic cable 110*b*. As used herein, "along a length" includes any coupling arrangements in which the fiber-optic cable 110 is coupled to the conductors 104 at multiple points along the length L2. As shown in FIG. 1B, in some examples, the fiber-optic cable 110*b* is coupled to the plurality of conductors 104 at various points along the length L2 via a number of attachment elements 156. In some examples, the attachment elements 156 include: straps, cords, adhesive material, and/or any combination thereof. In some examples, the attachment elements 156 are configured to wrap around a portion of the conductors 104 and the fiber-optic cable 110 simultaneously. In some examples, "along a length" includes coupling arrangements in which the conductors 104 and the fiber-optic cable 110 are both encased within the same jacket. Although not pictured, in some examples, "along a length" includes coupling arrangements in which the fiber-optic cable 110 is coupled to the conductors 104 via a single attachment member. In some examples, the single attachment member spans a majority of the length L2 of the fiber-optic cable.

FIG. 1C is a side view of a network cable 102*c* having two connectors 106, according to various embodiments. As shown in FIGS. 1A-C, in some examples, a first end 112 of a fiber-optic cable is positioned at a first end 132 of the network cable 102*c*. As shown in FIGS. 1A-B, in some examples, the fiber-optic cable 110 extends through both connectors 106 and to a second end 134 of the network cable 102*a*, 102*b*. As shown in FIG. 1C, in some examples, the fiber-optic cable 110 does not extend into the second connector 106. In some examples, the second end 114 of the fiber-optic cable is positioned proximate to the second end 124 of the conductors 104. In some examples, the fiber-optic cable 110 is configured to illuminate the entirety of the second connector 106.

FIG. 2A is a close-up, perspective view of a network cable 102*a*, according to various embodiments. In some examples, the network cable 102*a* is an embodiment of any one of the network cables 102*a*, 102*b*, and/or 102*c*.

As shown in FIG. 2A, in some examples, the network cable 102*a* includes a connector 106*a*, and the first end 112 of the fiber-optic cable 110 extends into the connector 106*a*. In some examples, the first end 112 of the fiber-optic cable 110 is positioned within a first raised section 142 of the connector 106.

As shown in FIG. 2A, in some examples, the connector 106*a* includes a tab 146, and the tab 146 extends at an angle with respect to the raised portion 142. In some examples, the tab 146 functions as a release lever to release the connector 106*a* from engagement with a jack and/or to allow insertion of the end 132 of the network cable 102*a* into a jack. In some examples, the tab 146 is of a sufficient length to allow the tab 146 to be compressed by a user.

FIG. 2B is a perspective view of a network cable 102*b* having two fiber optic cables 110, according to various embodiments. In some examples, the network cable **102*b* is an embodiment of any of the network cables 102*a*, 102*b*, and/or 102*c***.

In some examples, the network cable **102*b* includes a connector 106*b* and two or more fiber optic cables 110. In some examples, each of the fiber optic cables 110 includes a first end 112 that is laterally offset from the pins 252. In some examples, the first ends of the fiber optic cables 110 are laterally offset from the pins 252 in opposite directions. In some examples, each of the fiber optic cables 110 is positioned within a separate raised section 142 of the connector 106*b***.

In some examples, the connector **106*b* includes the tab 146. In some examples, the tab 146 is positioned between the raised sections 142. In some examples, the tab 146 extends beyond the raised sections 142. In some examples, the tab 146 extends at an angle θ with respect to the raised sections 142. In some examples, this angle θ facilitates user access to the tab 146. In some examples, the angle θ is greater than zero and not greater than 45 degrees. In some examples, the tab 146 has a length L2 of 10 millimeters ("mm") or more. In some examples, one or both of the angle of the tab 146 with respect to the raised sections 142 and/or the length 13 of the tab 146 is sufficiently large such that an end 247 is above the raised sections 142 in a direction substantially perpendicular to the raised sections 142**.

FIG. 3 is a schematic block diagram illustrating an end view of a jack 308 engaged with the connector 106, according to various embodiments. FIG. 3 shows a view from an end of a jack 308 where a connector 106 is inserted. For convenience, the perimeter of the connector 106 is shown in FIG. 3 in dashed lines to illustrate alignment between the jack 308 and the connector 106. In some examples, the view shown in FIG. 3 is in a virtual plane that is substantially parallel to an end 132 of the network cable 102 configured to engage with the jack 308. In some examples, a connector 106 of a network cable 102 is configured to engage with the jack 308. In some examples, the connector 106 is an embodiment of the connector **106*b***.

In some examples, the jack 308 includes a jack of a computing device. In some examples, the computing device includes a computer and/or a server. In some examples, the jack 308 includes a jack of: a switch, a patch panel, a router, a wall outlet, a cable testing device 502, or the like, and/or any combination thereof.

Figure 4A:
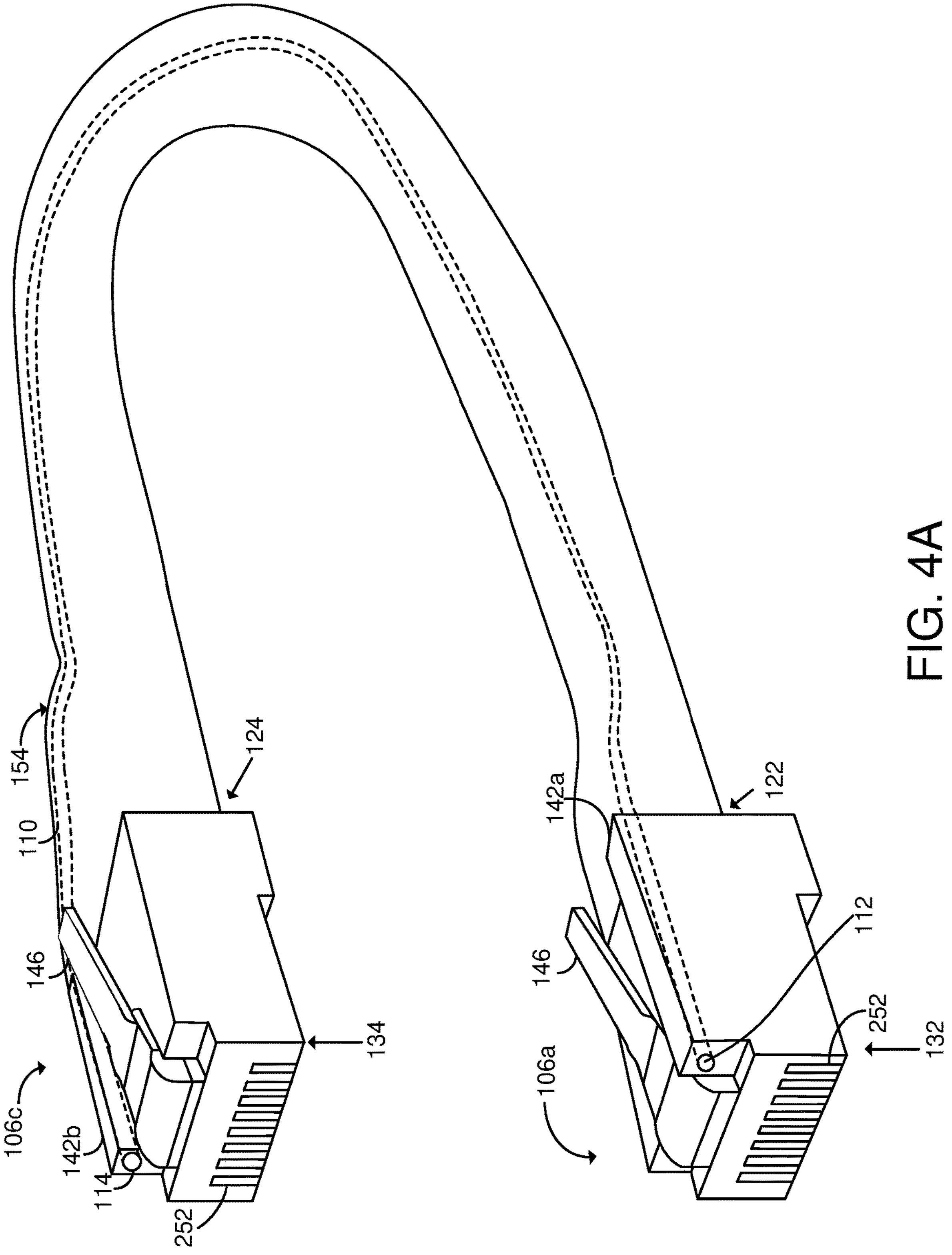
FIG. 4A is a perspective view of a network cable, according to various embodiments.
Figure 4B:
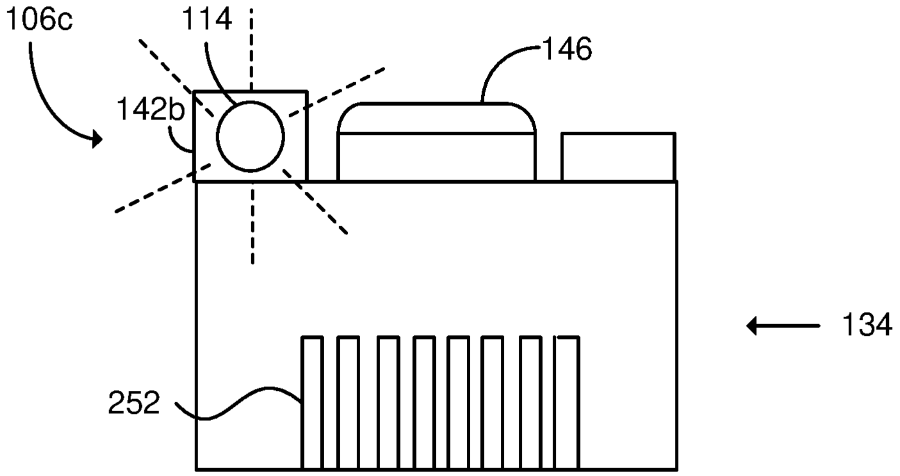
FIG. 4B is a front view of a network cable, according to various embodiments.

As shown in FIG. 3, in some examples, the jack 308 is adjacent to a first light source 320. In some examples, the jack 308 is also adjacent to a second light source 320. In some examples, each fiber optic cable 110 includes an end 112 that is positioned on the connector 106 to align with at least one of the light sources 320 when the connector 106 is engaged with the jack 308. In some examples, light from the light sources 320 is transmitted within a fiber-optic cable 110 to a second end 114 of the fiber-optic cable 110 opposite to the first end 112. As shown in FIGS. 4A-B, in some examples, the second end 114 is positioned on an additional connector.

As shown in FIG. 3, in some examples, the connector 106 includes one or more raised sections 142. In some examples, each raised section 142 is positioned to align with at least one light source 320 adjacent to the jack 308 when the connector 106 is engaged with the jack 308. In some examples, each raised section 142 includes a first end 112 of a fiber-optic cable 110 positioned therein.

As shown in FIG. 3, in some examples, a cross-sectional perimeter of the connector 106 is greater than a perimeter of the jack 308. In some examples, the raised sections 142 are raised with respect to an edge 349 of the connector 106. As shown in FIG. 3, in some examples, each of the first ends 112 are substantially centered within a light source 320. In other examples, the first end 112 only partially overlaps with the light source 320. As shown in FIG. 3, in some examples, the raised section 142 completely covers a light source 320 when the connector 106 engages with the jack 308. In other examples, the raised section 142 only partially covers the light source 320. In some examples, the first end 112 and/or the raised section 142 makes physical contact with a light source 320. In other examples, neither the first end 112 nor the raised section 142 make physical contact with a light source 320 adjacent to the jack 308.

In some examples, a light source 320 includes a light-emitting diode ("LED"). In some examples, the light source 320 is an activity LED for the jack 308. In some examples, two or more light sources 320 are adjacent to the jack 308, and each light source 320 is configured to emit light of different wavelengths and/or different colors. In some examples, at least one of the light sources 320 is configured to indicate at least one of the following parameters for the jack 308: network connectivity, connection speed, power over Ethernet status, network traffic, connection state (e.g., whether a connector 106 at an opposite end of the network cable 102 is also engaged), connection issues, and/or any combination thereof. In some examples, a first light source 320 is configured to indicate a first parameter, and another light source 320 is configured to indicate a second parameter different from the first parameter.

FIG. 4A is a perspective view of a network cable **102*a*, according to various embodiments. In some examples, the network cable 102*a* includes two connectors 106. In some examples, a first connector 106 is positioned at a first end 132 of the network cable 102*a*, and a second connector 106 is positioned at a second end 134 opposite to the first end 132. In some examples, the first connector 106 is coupled to the conductors 104 proximate to the first end 122 of the conductors 104, and the second connector 106 is coupled to the conductors 104 proximate to the second end 124 of the conductors 104**.

As shown in FIG. 4A, in some examples, each of the connectors 106 includes a raised portion **142*a* or 142*b*. In some examples, the first end 112 of the fiber-optic cable 110 is positioned within a first raised portion 142*a* of a first connector 106*a*, and the second end 114 of the fiber-optic cable is positioned within a second raised portion 142*b* of a second connector 106*b*. In some examples, the second end 114 of the fiber-optic cable 110 is positioned to align with a source (e.g., 320) with the first raised section 142*a* of the connector 106*a* of the first end 112. In some examples, the first end 112 and the first raised portion 142*a* are positioned to align with a light source and transmit light from the first end 112 to the second end 114, even while the second end 114 is positioned within the second raised portion 142*b***.

In some examples, the raised portions **142*a* and 142*b* are positioned on opposite sides of the tabs 146. As shown in FIG. 4A, in some examples, the first raised portion 142*a* is laterally offset from the tab 146 in a first lateral direction. In some examples, the second raised portion 142*b* is laterally offset from the tab 146 in a second lateral direction opposite to the first lateral direction. Such embodiments improve versatility of the network cable 102*a* by facilitating use with jacks having only one adjacent light source rather than two, as shown in FIG. 3. In some examples, the user selects a network cable end 132 or 134** to engage with a jack adjacent to only a single light source based on the position of the light source with respect to the jack.

FIG. 4B is a front view of the second end 134 of the network cable 102*a*, according to various embodiments. As shown in FIG. 4B, in some examples, the second end 114 of the fiber-optic cable 110 is positioned to align with a light source on a jack such that the light is visible through the second end 114 of the fiber-optic cable 110. In some examples, light is transmitted within the fiber-optic cable to the second end 114, which is opposite to the first end 112. In such examples, a user may identify a network cable 102*a* corresponding to a particular jack by viewing the second end 134 of the network cable 102*a* and detecting light through the second end 114. In some examples, the light is not visible along a length of the network cable 102*a* and is only visible through the second end 114. Although not shown in FIG. 4B, embodiments of the present disclosure include a network cable (e.g., network cable 202*b*) having two fiber-optic cables 110. In some examples, light from both fiber-optic cables 110 is separately visible at a second end 134 of the network cable 202*b* via the second ends 114 of the fiber-optic cables 110.

As shown in FIG. 4B, in some examples, transmitting the light within the fiber-optic cable 110 to the second end 114 illuminates the second end 114 of the fiber-optic cable 110. In some examples, the second end 114 is exposed to allow viewing of the light. In some examples, transmitting the light within the fiber-optic cable 110 illuminates the entire connector 106 at the second end 134. In some examples, the connector is made of a translucent and/or transparent material.

FIG. 5A is a schematic block diagram illustrating a system 500 for cable identification, according to various embodiments. In some examples, the system 500 includes a computing device 506, and the computing device includes a cable testing device 502. In some examples, the cable apparatus 502 is communicably coupled to the jack 508*a* and configured to control one or more test lights 520 of the jack 508*a*. In some examples, the system 500 also includes an electronic display 512 having a GUI 514. In some examples, the cable test apparatus 502 is configured to activate and/or deactivate a test light source 520 of the jack 508*a* for cable identification.

In some examples, the jack 508*a* is an embodiment of the jack 308. In some examples, the test light source 520 is an embodiment of the light source 320. In some examples, the jack 508*a* is positioned within a housing 509, and the test light source 520 is positioned on the housing 509.

In some examples, a network cable 102 is configured such that the first end 112 of the fiber-optic cable 110 aligns with the test light source 520 when the connector 106 engages with the jack 508*a*. In some examples, light from the test light source 520 illuminates the first end 112 of the fiber-optic cable 110 and transmits light to the second end 114 of the fiber-optic cable 110.

As shown in 5A, in some examples, the network cable 102 includes a first connector 106*a* on a first end 132 and a second connector 106 on a second end 134. In some examples, the first connector 106*c* is configured to engage with a first jack 508*a*, and the second connector 106 is configured to engage with a second jack 508*b* separate from the first jack 508*a*. In some examples, as shown in FIG. 5A, the first jack 508*a* is communicably coupled to the cable test apparatus 502, and the second jack 508*b* is a jack of another computing device, such as a network device 510 that is not in communication with the cable test apparatus 502.

In some examples, the cable test apparatus 502 is part of the computing device 506. In some examples, the computing device 506 utilizes the network cable 102 for network communications. In some examples, the computing device 506 includes: a network device, a server, a patch panel, a switch, and/or any combination thereof. In some examples, the computing device 506 includes a device having multiple jacks 508, including the jack 508*a*. In other examples, the jack 508*a* is a portable, lightweight box, as shown in FIG. 5B. In some examples, the test light source 520 is powered by a power supply within the jack 508, such as a battery.

As shown in FIG. 5A, in some examples, the test light source 520 is configured to transmit light into the first end 112 of the fiber-optic cable 110 and through to the second end 114 of the fiber-optic cable 110, when the connector 106 is engaged with the first jack 508*a*, as shown in FIG. 5B. In some examples, the test light source 520 is actuated by the cable test apparatus 502. In some examples, the cable test apparatus 502 is a controller of the computing device 506.

In some examples, the cable testing apparatus 502 is portable. In some examples, the jack 508*a* is not configured to provide a connection between the network device 510 and any other computing device 506. In some examples, the first jack 508*a* configured solely to emit light via the light source 520 for identification of the network cable 102. In some examples, the first jack 508*a* is configured to receive the connector 106 without forming an electrical connection between the network cable 102 and the computing device 506.

FIG. 5B is a schematic block diagram illustrating a system 500 for cable identification with a network cable 102 plugged into the jack 508*a*, according to various embodiments.

Figure 6:
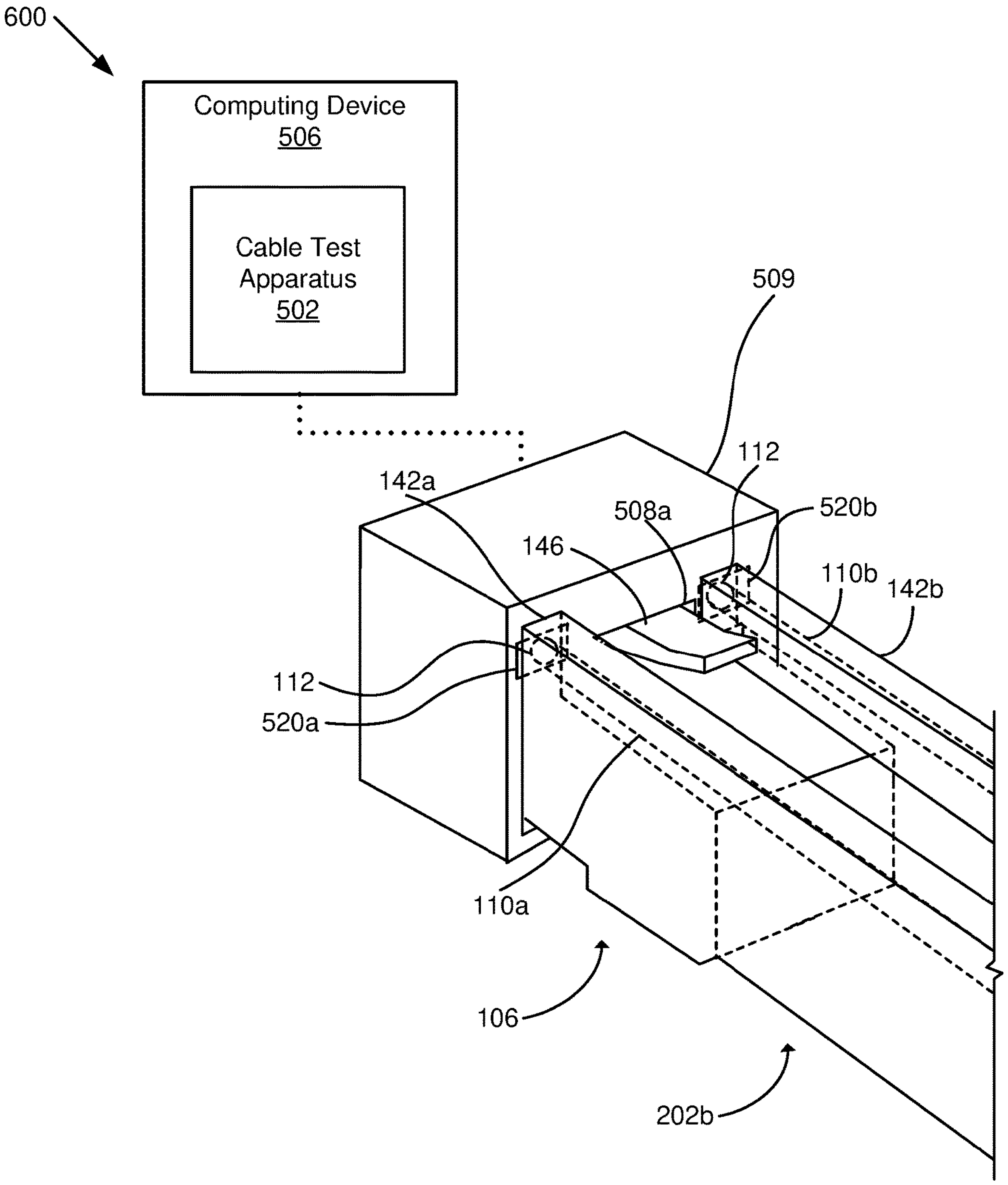
FIG. 6 is a schematic block diagram illustrating a close-up view of a system for cable identification for a network cable having two or more fiber optic cables, according to various embodiments.

FIG. 6 is a schematic block diagram illustrating a close-up view of a cable identification system 600 for cable identification with a network cable 202*b* having two fiber-optic cables 110 plugged into the jack 508*a*. In some examples, the cable identification system 600 share similar features with the cable identification system 500.

As shown in FIG. 6, in some examples, the jack 508*a* is configured to receive the connector 106. In some examples, the jack housing 509 includes a first test light source 520*a* and a second test light source 520*b*. In some examples, the network cable 202*b* includes a first fiber-optic cable 110*a* and a second fiber-optic cable 110*b*. In some examples, the second fiber-optic cable 110*b* includes an end 112 that is positioned within a second raised section 142*b* of the connector 106 to align with the second test light source 520*b*. In some examples, an opposite end 114 of the second fiber-optic cable 110 is positioned to align with the second test light source 520*b* with a raised section 142 of the opposite connector 106, as shown in FIG. 5A.

Figure 7:
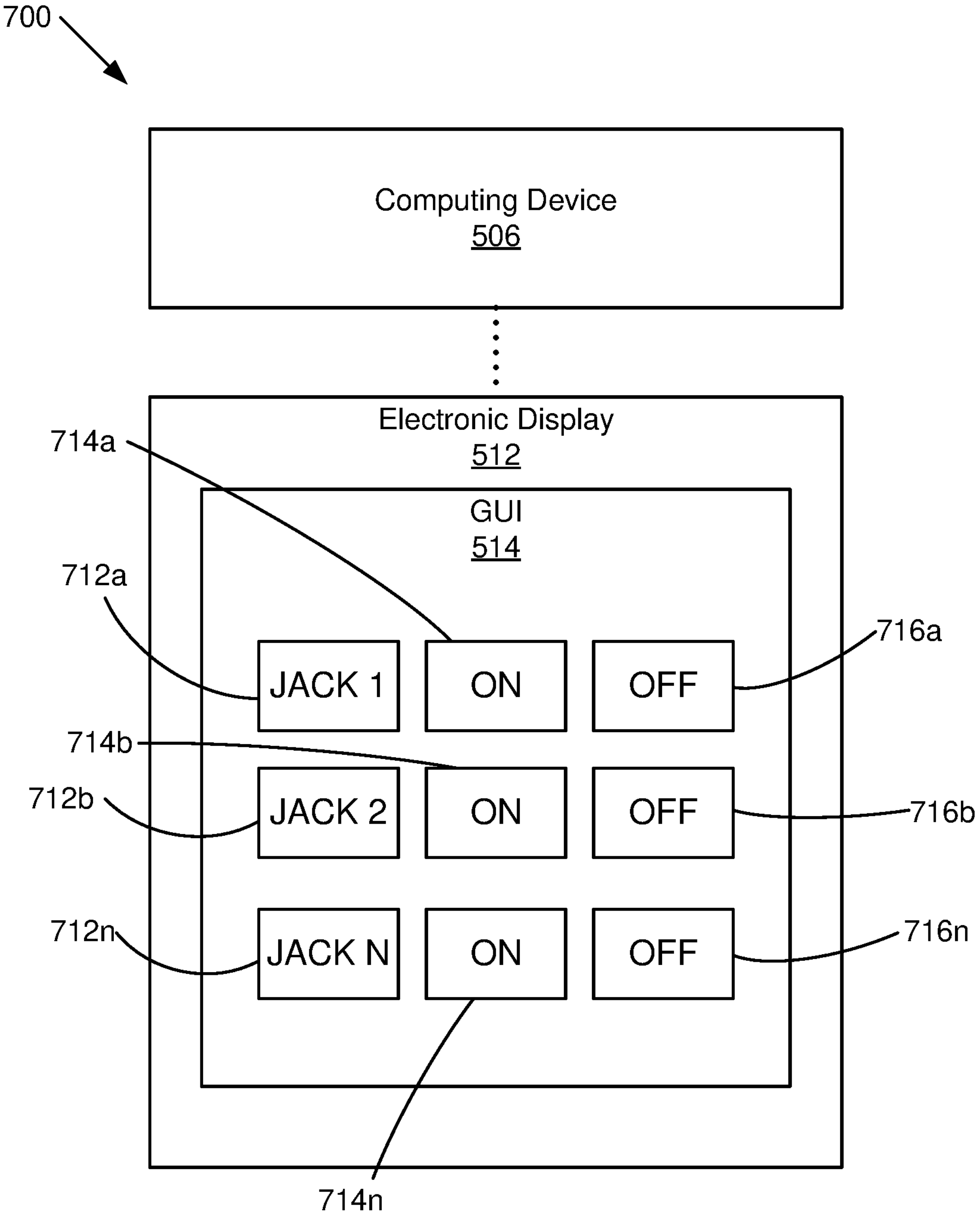
FIG. 7 is a schematic block diagram illustrating a user interface of a system for cable identification, according to various embodiments.

FIG. 7 is a schematic block diagram illustrating a system 700 for cable identification, according to various embodiments. In some examples, the system 700 is an embodiment of the system 500 and/or the system 600. In some examples, the system 700 includes the computing device 506 in communication with the electronic display 512. In some examples, the system 700 includes an application providing the GUI 514 on the electronic display 512.

In some examples, the GUI 514 is configured to receive user input for the cable test apparatus 502 to activate and/or deactivate the test light sources 520 and/or 620. In some examples, the system 500 includes multiple jacks 508 in communication with the cable test apparatus 502. In some examples, each of the jacks 508 is represented graphically as "JACK 1", "JACK 2", "JACK N", etc. on the GUI 514 via icons 712*a*, 712*b*, . . . , 712*n*. In some examples, the GUI 514 includes buttons 714*a*, 714*b*, 714*n* for activating test light sources 520 and/or buttons 716*a*, 716*b*, 716*n* for de-activating test light sources 520.

Although FIG. 7 shows a GUI 514 through the test light source 520 is controlled, examples of the present disclosure are not so limited. Examples of the present disclosure also include text-based interfaces configured to gather input from the user for use with a command-line tool. In some examples, the command-line tool includes a command-line tool configured to control the light source 520 to identify the network cable 102, such as the Linux® Ethtool.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A network cable, comprising:
- a plurality of network cable conductors comprising a first end and a second end;
- a connector coupled to the first end of the network cable conductors, the connector configured to engage with a jack; and
- a fiber-optic cable attached to the plurality of network cable conductors and extending along a length of the network cable, the fiber-optic cable comprising a first end positioned on the connector to align with a light source adjacent to the jack, wherein the fiber-optic cable is configured to guide light received from the light source along the length of the fiber-optic cable to provide visual identification of the network cable.

2. The network cable of claim 1, wherein:
- the fiber-optic cable is a first fiber-optic cable;
- the light source is a first light source; and
- the network cable further comprises a second fiber-optic cable attached to the plurality of network cable conductors, the second fiber-optic cable comprising a first end positioned on the connector to align with a second light source adjacent to the jack, wherein the fiber-optic cable is configured to guide light received from the light source along the length of the fiber-optic cable to provide visual identification of the network cable.

3. The network cable of claim 2, wherein the first end of the first fiber-optic cable is positioned to align with the first light source with a first raised section of the connector and the first end of the second fiber-optic cable is positioned to align with the second light source with a second raised section of the connector, and wherein the connector further comprises a tab configured to release the connector from the jack and positioned between the first and second raised sections, the tab extending beyond the first and second raised sections.

4. The network cable of claim 2, wherein the jack comprises a first jack, the connector is a first connector and further comprising a second connector at the second end of the plurality of network cable conductors, wherein, when the second connector is plugged into a second jack, the second end of the second fiber-optic cable is positioned to align with the first light source with a first raised section of the second connector and the second end of the first fiber-optic cable is positioned to align with the second light source with a second raised section of the second connector.

5. The network cable of claim 1, wherein transmitting the light within the fiber-optic cable to the second end of the fiber-optic cable illuminates the second end of the fiber-optic cable and the second end of the fiber-optic cable is visually exposed to allow viewing of the light.

6. The network cable of claim 1, wherein the connector is a first connector and further comprising a second connector coupled to the second end of the network cable conductors, wherein the second end of the fiber-optic cable is positioned to illuminate the second connector.

7. The network cable of claim 1, wherein a length of the fiber-optic cable between the first end and the second end is positioned to be visible to a user and wherein light from the light source is visible along the length of the fiber-optic cable.

8. The network cable of claim 7, wherein the length of the fiber-optic cable is visible through a jacket surrounding the plurality of network cable conductors and fiber-optic cable and/or is exposed through a gap in a jacket surrounding the plurality of network cables and fiber-optic cable.

9. The network cable of claim 1, further comprising a cable testing device comprising an additional jack and a test light source positioned adjacent to the additional jack, the test light source positioned to align with the first end of the fiber-optic cable, wherein light from the test light source illuminates the first end of the fiber-optic cable and transmits light to the second end of the fiber-optic cable.

10. The network cable of claim 1, wherein the light source is offset from the jack and wherein the connector further comprises a raised section configured to maintain the first end of the fiber-optic cable aligned with the light source.

11. A system, comprising:
- a cable testing apparatus comprising:
  - a jack; and
  - a light source adjacent to the jack; and
- a network cable, comprising:
  - a plurality of network cable conductors comprising a first end and a second end;
  - a connector coupled to the first end of the network cable conductors, the connector configured to engage with the jack; and
  - a fiber-optic cable attached to the plurality of network cable conductors and extending along a length of the network cable, the fiber-optic cable comprising a first end positioned on the connector to align with the light source, wherein the fiber-optic cable is configured to guide light received from the light source along the length of the fiber-optic cable to provide visual identification of the network cable.

12. The system of claim 11, wherein the cable testing apparatus is portable and the jack is configured to receive the connector without forming an electrical connection between the network cable and the cable testing apparatus.

13. The system of claim 11, wherein a computing device comprises the cable testing apparatus and utilizes the network cable for network communications.

14. The system of claim 11, wherein the cable test apparatus further comprises a controller configured to activate and/or deactivate the light source.

15. The system of claim 14, further comprising an application providing a graphical user interface ("GUI"), the GUI configured to receive user input to activate and/or deactivate the light source via the controller.

16. The system of claim 11, wherein the fiber-optic cable is a first fiber-optic cable and the light source is a first light source, and wherein the cable testing apparatus further comprises a second light source and the network cable further comprises a second fiber-optic cable attached to the plurality of network cable conductors, the second fiber-optic cable comprising a first end positioned on the connector to align with a second light source adjacent to the jack and light from the light source is transmitted within the second fiber-optic cable to a second end of the second fiber-optic cable opposite to the first end.

17. The system of claim 16, wherein the first end of the first fiber-optic cable is positioned to align with the first light source with a first raised section of the connector and the first end of the second fiber-optic cable is positioned to align with the second light source with a second raised section of the connector, and wherein the connector further comprises a tab configured to release the connector from the jack and positioned between the first and second raised sections, the tab extending beyond the first and second raised sections.

18. The network cable of claim 11, wherein the jack comprises a first jack, the connector is a first connector and further comprising a second connector at the second end of the plurality of network cable conductors, wherein, when the second connector is plugged into a second jack, the second end of the second fiber-optic cable is positioned to align with the first light source with a first raised section of the second connector and the second end of the first fiber-optic cable is positioned to align with the second light source with a second raised section of the second connector.

19. The network cable of claim 11, wherein transmitting the light within the fiber-optic cable to the second end of the fiber-optic cable illuminates the second end of the fiber-optic cable and the second end of the fiber-optic cable is visually exposed to allow viewing of the light.

20. A network cable, comprising:

a plurality of network cable conductors comprising a first end and a second end;

a first connector coupled to the first end of the network cable conductors, the first connector configured to engage with a jack;

a first fiber-optic cable attached to the plurality of network cable conductors and extending along a length of the network cable, the first fiber-optic cable comprising a first end positioned on the first connector to align with a first light source adjacent to the jack with a first raised section of the first connector, wherein the fiber-optic cable is configured to guide light received from the light source along the length of the fiber-optic cable to provide visual identification of the network cable;

a second fiber-optic cable attached to the plurality of network cable conductors and extending along the length of the network cable, the second fiber-optic cable comprising a first end positioned on the first connector to align with a second light source adjacent to the jack with a second raised section of the first connector, wherein the fiber-optic cable is configured to guide light received from the light source along the length of the fiber-optic cable to provide visual identification of the network cable; and a second connector at the second end of the plurality of network cable conductors, wherein when the second connector is plugged into the jack, the second end of the second fiber-optic cable is positioned to align with the first light source with a first raised section of the second connector and the second end of the first fiber-optic cable is positioned to align with the second light source with a second raised section of the second connector.

* * * * *